United States Patent [19]
Murayama et al.

[11] Patent Number: 5,784,274
[45] Date of Patent: Jul. 21, 1998

[54] SYSTEM AND METHOD FOR MONITORING ERRORS OCCURRING IN DATA PROCESSED BY A DUPLEXED COMMUNICATION APPARATUS

[75] Inventors: Masami Murayama; Naoyuki Izawa, both of Kawasaki, Japan

[73] Assignee: Fujitsu Limited, Kanagawa, Japan

[21] Appl. No.: 609,918

[22] Filed: Feb. 29, 1996

[51] Int. Cl.⁶ .................................................. G05B 15/00
[52] U.S. Cl. .................. 364/184; 364/550; 364/551.01; 364/131; 371/5.1; 371/20.1; 370/276; 370/242
[58] Field of Search ................................ 364/184–182, 364/131, 141, 154 R, 514 A, 514 B, 514 C, 550, 551.01, 520, 579, 569, 552, 132; 370/276, 219–221, 244, 249, 250, 227, 242; 379/1, 5, 15, 24, 26, 33, 34; 375/224, 225; 395/728, 182.02, 183.01, 183.15, 185.01, 185.05, 184.01, 181, 182.05, 182.09; 371/40.2, 2, 5.1–5.3, 62, 20.1, 20.4, 20.5, 68.1, 68.2, 48, 57.2; 377/19, 20, 27–29, 30, 33, 37, 39; 340/825.06, 825.16, 825.65, 825.67

[56] References Cited

U.S. PATENT DOCUMENTS

| | | | |
|---|---|---|---|
| 5,153,578 | 10/1992 | Izawa et al. | 370/219 |
| 5,448,720 | 9/1995 | Uriv et al. | 395/728 |
| 5,557,548 | 9/1996 | Gover et al. | 364/569 |
| 5,619,189 | 4/1997 | Sugawara | 340/825.06 |
| 5,619,641 | 4/1997 | Ohuchi et al. | 395/181 |

*Primary Examiner*—Emanuel Todd Voeltz
*Assistant Examiner*—Hal D. Wachsman
*Attorney, Agent, or Firm*—Helfgoti & Karas, P.C.

[57] ABSTRACT

A performance monitor system monitors a number of errors occurring in data processed in a communication apparatus having a duplex configuration formed of two systems. The performance monitor system includes a first unit for monitoring a number of errors occurring in data processed in one of the two systems a second unit for monitoring a number of errors occurring in data processed in another one of the two systems and a control unit for controlling operations of the first and second units. Each of the first and second units has a first counter outputting a first error count value and a second counter outputting a second error count value. The control unit controls the first and second counters so that the sum of the first and second error count values obtained in the first unit is equal to sum of those obtained in the second unit.

4 Claims, 9 Drawing Sheets

SYSTEM AND METHOD FOR MONITORING ERRORS OCCURRING IN DATA PROCESSED BY A DUPLEXED COMMUNICATION APPARATUS

BACKGROUND OF THE INVENTION (1) Field of the Invention

The present invention generally relates to a performance monitor system and method, and more particularly to performance monitor system and method by which transmission performance (e.g., transmission quality) is monitored in a communication system, such as in a switching system, having a duplex configuration.

(2) Description of the Related Art

It is required that transmission performance (transmission quality) should be monitored in a switching system. In a monitoring operation, a number of errors (e.g., bit errors) which occur in the switching system are counted. The counted number of errors is then monitored as information representing the transmission performance (the transmission quality).

A switching system in which the transmission performance is monitored is formed as shown in FIG. 1. Referring to FIG. 1, the switching system has a duplex configuration in which two SP (Speech Path) systems 100(1) and 100(2) and two CP (Central Processor) systems 200(1) and 200(2) are provided to improve reliability. One SP system 100(1) is used as a 0-system and the other SP system 100(2) is used as a 1-system. Each of the SP systems 100(1) and 100(2) are connected with a plurality of subscriber terminals and performs a switching operation to form a data route (a speech path) between subscriber terminals. In FIG. 1, the data route is indicated by a thick line.

One CP system 200(1) is used as a 0-system and the other CP system 200(2) is used as a 1-system. Each of the CP systems 200(1) and 200(2) performs control/monitor operations for both the SP systems 100(1) and 100(2). In the control/monitor operations, the switching operation performed to form a data route between a subscriber terminal and another subscriber terminal in each of the SP systems 100(1) and 100(2) is controlled. In addition, states of the SP systems 100(1) and 100(2) are controlled. Each of the SP systems 100(1) and 100(2) may be in an OUS (Out of Service) state and in an INS (In-Service) state. In FIG. 1, signals used in the control/monitor operation are indicated by thin lines.

The above INS state is an operable state where the switching operation with respect to data from a subscriber terminal can be performed. The above OUS state is an inoperable state where the switching operation cannot be performed because of maintenance for the system.

Each of the SP systems 100(1) and 100(2) which is in the INS state may operate as a main-system or a sub-system. In a case where both the SP systems 100(1) and 100(2) are in the INS state, one SP system (for example, the SP system 100(1)) operates as the main-system and the other SP system (for example, the SP system 100(2)) operates as the sub-system. In this case, data transmitted from a subscriber terminal is supplied to both the SP systems 100(1) and 100(2), and the respective SP systems 100(1) and 100(2) then perform the same switching operation for selecting a data route through which the data is to be transmitted. The data to be transmitted through the selected data route is output from both the SP systems 100(1) and 100(2). A selector provided at a point (a) selects the data output from the SP system 100(1) operating as the main-system. As a result, the data output from the SP system 100(1) operating as the main-system is transmitted to another subscriber terminal through the selected data route. In this state, when the SP system 100(1) which operates as the main-system malfunctions (a large number of errors occur), the state of the SP system 100(1) is switched from the INS state to the OUS state. Simultaneously, the SP system 100(2) is switched from the sub-system to the main-system. After this, the SP system 100(2) operates as the main-system, so that the data from a subscriber terminal is transmitted via the SP system 100(2) to another subscriber terminal.

Each of the SP systems 100(1) and 100(2) is provided with a performance monitor unit. The performance monitor unit is formed as shown in FIG. 2. Referring to FIG. 2, the performance monitor unit has a checking circuit 3, an error counter 10, a first register 5, a second register 6 and a comparator 7. The checking circuit 3 checks whether an error (e.g., a bit error) occurs in data received by the SP system. The error counter 10 increments an error count value by one when the checking circuit 3 detects that an error has occurred in the data. That is, the error counter 10 counts the number of errors (e.g., bit errors) which have occurred in the data received by the SP system. When a reset signal is supplied to the error counter 10, the error counter is reset to "0". The error count value C in the error counter 10 is set in the first register 5 when a hold signal is supplied to the first register 5. A predetermined threshold value is set in the second register 6. The predetermined threshold value depends on the kind of errors to be detected. The comparator 7 compares the error count value C in the error counter 10 with the predetermined threshold value set in the second register 6. When the count value C exceeds the predetermined threshold value, the comparator 7 outputs a TCA (Threshold Crossing Alert).

In the performance monitor unit having the above configuration, the reset signal is supplied to the error counter 10 at predetermined intervals (e.g., 15 minutes). Each of the intervals is referred to as an error collection cycle. As shown in FIG. 3, in every error collection cycle, the error counter 10 counts the number of errors detected by the checking circuit 3. In every error collection cycle, if the error count value C exceeds the threshold value TH, the TCA is output.

When both the SP systems 100(1) and 100(2) are in the INS state, the same error counting operation (a performance monitoring operation) as described above is performed in the respective performance monitor units. A result (the error count value and the state of the TCA) obtained by the performance monitor unit in the SP system operating as the main-system is selected as a monitoring result. If the state of one SP system which has operated as the main-system is changed to the OUS state, the other SP system which has operated as the sub-system is switched to the main-system and starts to operate as the main-system. The error count value of the performance monitor unit in the SP system which has started to operate as the main-system is substitutionally used as the monitoring result. Since the same error counting operation is performed in both the performance monitor units in the main-system and the sub-system, even when the SP system operating as the main-system is changed, the monitoring result is not changed.

However, in a case where the state of one SP system is changed from the OUS state to the INS state and the state of the other SP system is then changed from the INS state to the OUS state in one error collecting cycle as shown in FIG. 4, a problem occurs.

Referring to FIG. 4, while one SP system (referred to as the 0-system) is operating as the main-system in the INS state, the state of the other SP system (referred to as the 1-system) is changed from the OUS state to the INS state. The 1-system then starts to operate as the sub-system (at a time $t_A$). After this, the state of the 0-system is changed from the INS state to the OUS state for maintenance (at a time $t_B$). At this time ($t_B$), the 1-system is switched from the sub-system to the main-system and starts to operate as the main-system.

The state changes of the 0-system and the 1-system as described above occur in one error collection cycle. It is supposed that five errors as shown by circled numbers (1, 2, 3, 4 and 5) occur in this error collection cycle. In this case, in the 0-system, the error counter 10 is reset at the start of the error collection cycle and is performing the error counting operation until the state of the 0-system is changed to the OUS state at the time $t_B$. As a result, the error count value C in the 0-system is equal to "4" immediately before the state of the 0-system is changed. On the other hand, in the 1-system, the error counter 10 is reset to "0" at the time $t_A$. At this time, the error count value of the error counter 10 in the 0-system is equal to "2". That is, the error count values in the 0-system operating as the main-system and the 1-system operating as the subsystem differ from each other. After this, every time an error occurs, the error counters 10 in both the 0-system (the main-system) and 1-system (the sub-system) increment the error count values by one. After the 1-system is changed from the sub-system to the main-system, the error count value in the 1-system is used as the monitoring result. As a result, at the end of the one error collection cycle, the error count value in the 1-system does not correctly represent the number of errors which have occurred in the one error collection cycle. In the example shown in FIG. 4, although the number of errors which occurred in the error collection cycle is five, the error count value in 1-system is three at the end of the error collection cycle. In this case, if the threshold value is set at "4", the TCA which should be output is not output in the error collection cycle.

SUMMARY OF THE INVENTION

Accordingly, a general object of the present invention is to provide a novel and useful performance monitor method and system in which the disadvantages of the aforementioned prior art eliminated.

A specific object of the present invention is to provide a performance monitor system, having the duplex configuration, which can always obtain a correct error count value as the monitoring result.

The above objects of the present invention are achieved by a performance monitor system for monitoring a number of errors occurring in data processed in a communication apparatus having a duplex configuration formed of two systems which are able to be in an operable state and in an inoperable state, each of said two systems being operating as one of a main-system and a sub-system in the operable state, said performance monitor system comprising: a first unit for monitoring a number of errors occurring in data processed in one of said two systems; a second unit for monitoring a number of errors occurring in data processed in another one of said two systems; and control means for controlling operations of said first and second units, wherein each of said first and second units comprises: a first counter counting the number of errors and outputting a first error count value; and a second counter counting the number of errors and outputting a second error count value, wherein said control means comprises: first control means for controlling said first counter and said second counter so that only said first counter is activated and starts to count the number of errors at a start of an error collection cycle; second control means for controlling said second counter in each of said two systems so that said second counter is activated and starts to count the number of error when a state of one of said two systems is changed from the inoperable state to the operable state under a condition in which another one of said systems is operating as the main-system in the operable state; third control means for controlling said first counter in one system which operates as the main-system so that the first error count value which is obtained when a state of another system is changed from the inoperable state to the operable state is maintained; and fourth control means for controlling said first counter in one system in which a state thereof is changed from the inoperable state to the operable state so that the first count value equal to the value which has been maintained in said first counter in another one system is set after the state of said one system is changed to the operable state, and wherein a sum of the first error count value and the second error count value in said first and second counter in each of first and second units are used as a monitoring result.

Another object of the present invention is provide a performance monitor method in a system having the duplex configuration which method can always obtain a correct error count value as the monitoring result.

The object of the present invention is achieved by a performance monitor method in a performance monitor system for monitoring a number of errors occurring in data processed in a communication apparatus having a duplex configuration formed of two systems which are able to be in an operable state and in an inoperable state, each of said two systems operating as one of a main-system and a sub-system in the operable state, said performance monitor system comprising a first unit for monitoring a number of errors occurring in data processed in one of said two systems and a second unit for monitoring a number of errors occurring in data processed in another one of said two systems, each of said second and first units comprising a first counter counting the number of errors and outputting a first error count value and a second counter counting the number of errors and outputting a second error count value, a sum of the first error count value and the second error count value being used as a monitoring result, said method comprising the steps of: (a) activating said first counter so that said first counter starts to count the number of errors at a start of an error collection cycle; (b) activating said second counter in each of said two systems so that said second counter starts to count the number of error when a state of one of said two systems is changed from the inoperable state to the operable state under a condition in which another one of said systems is operating as the main-system in the operable state; (c) maintaining the first error count value which is obtained, in said first counter in one system which operates as the main-system, when a state of another system is changed from the inoperable state to the operable state; and (d) controlling said first counter in one system in which a state thereof is changed from the inoperable state to the operable state so that the first count value equal to the value which has been maintained in said first counter in another one system is set after the state of said one system is changed to the operable state.

According to the present invention, each of the first and second units in two systems is provided with two counters: the first and second counters outputting the number of errors. The first and second counters in each of the first and second units are controlled so that the sum of the first and second error count values obtained in the first unit is equal to the sum of those obtained in the second unit. The sum of the first and the second error count values is used as the monitoring result. Thus, even if the states of the two systems are variously changed, a correct error count value as the monitoring result can always be obtained.

BRIEF DESCRIPTION OF THE DRAWINGS

Other objects, features and advantages of the present invention will be apparent from the following description when read in conjunction with the accompanying drawings, in which.

DETAILED DESCRIPTION OF THE PREFERRED EMBODIMENTS

A description will be given of an embodiment of the present invention.

Figure 1:
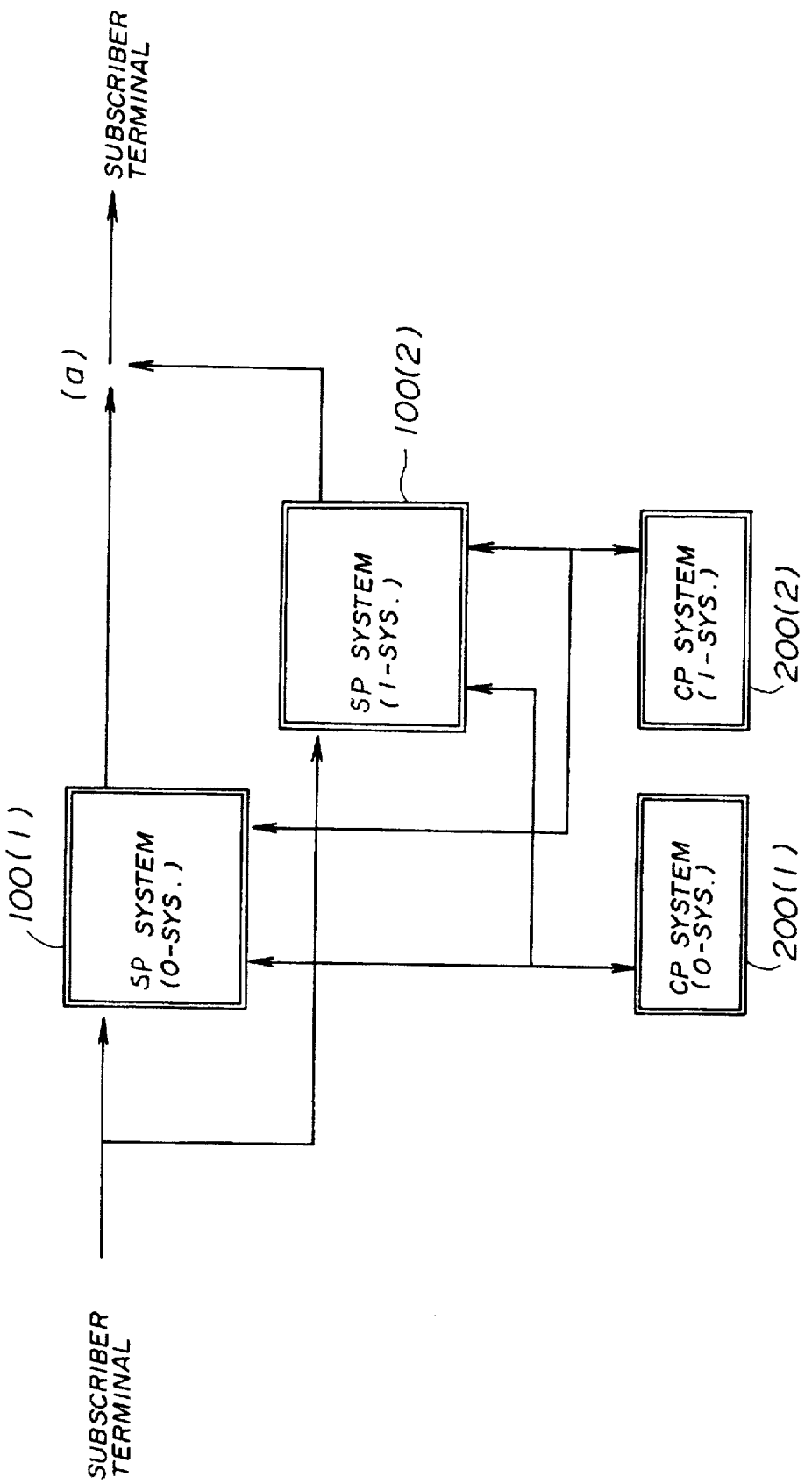
FIG. 1 is a block diagram illustrating a general example of a switching system having the duplex configuration.
Figure 2:
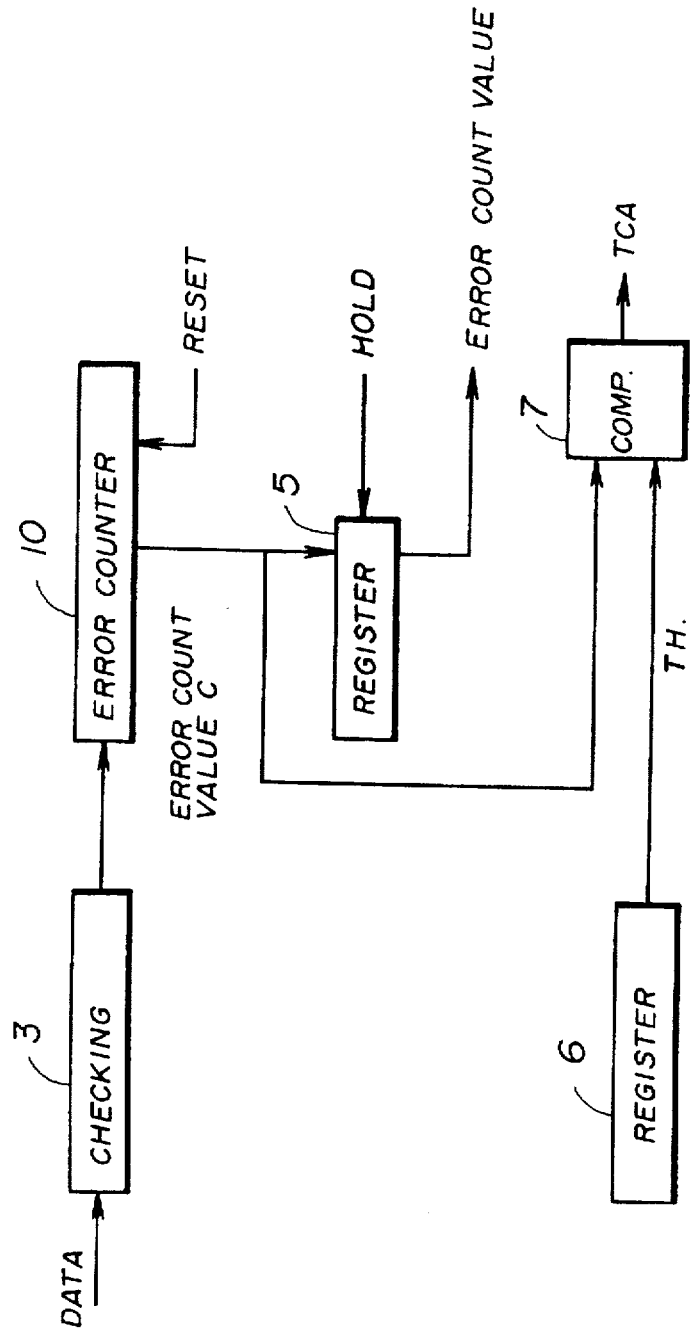
FIG. 2 is a block diagram illustrating a conventional performance monitor unit provided in the switching system.
Figure 3:
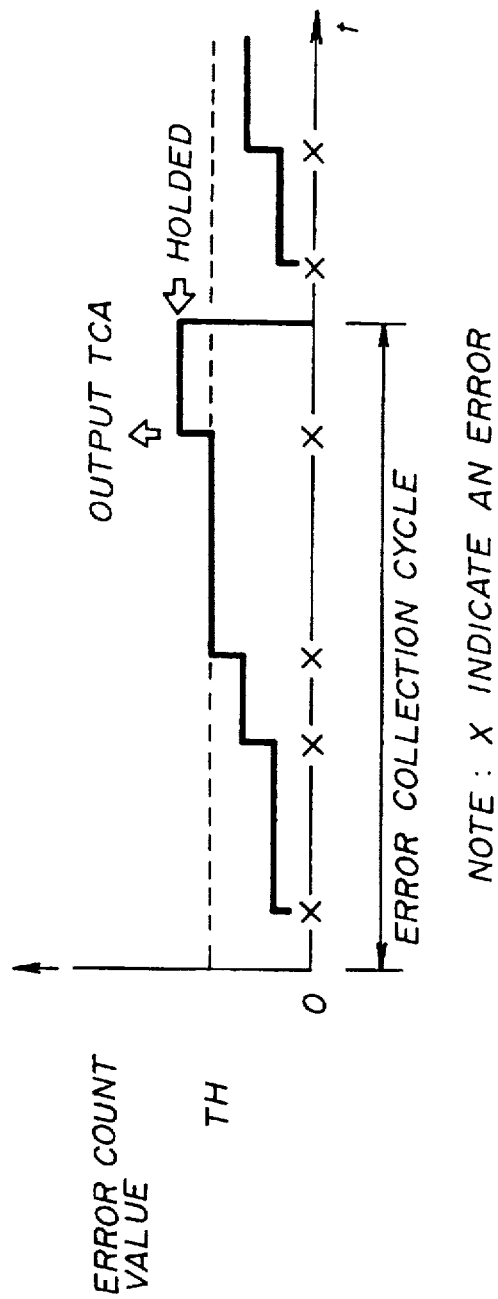
FIG. 3 is a timing chart illustrating an error counting operation performed by the performance monitor unit shown in FIG. 2.
Figure 4:
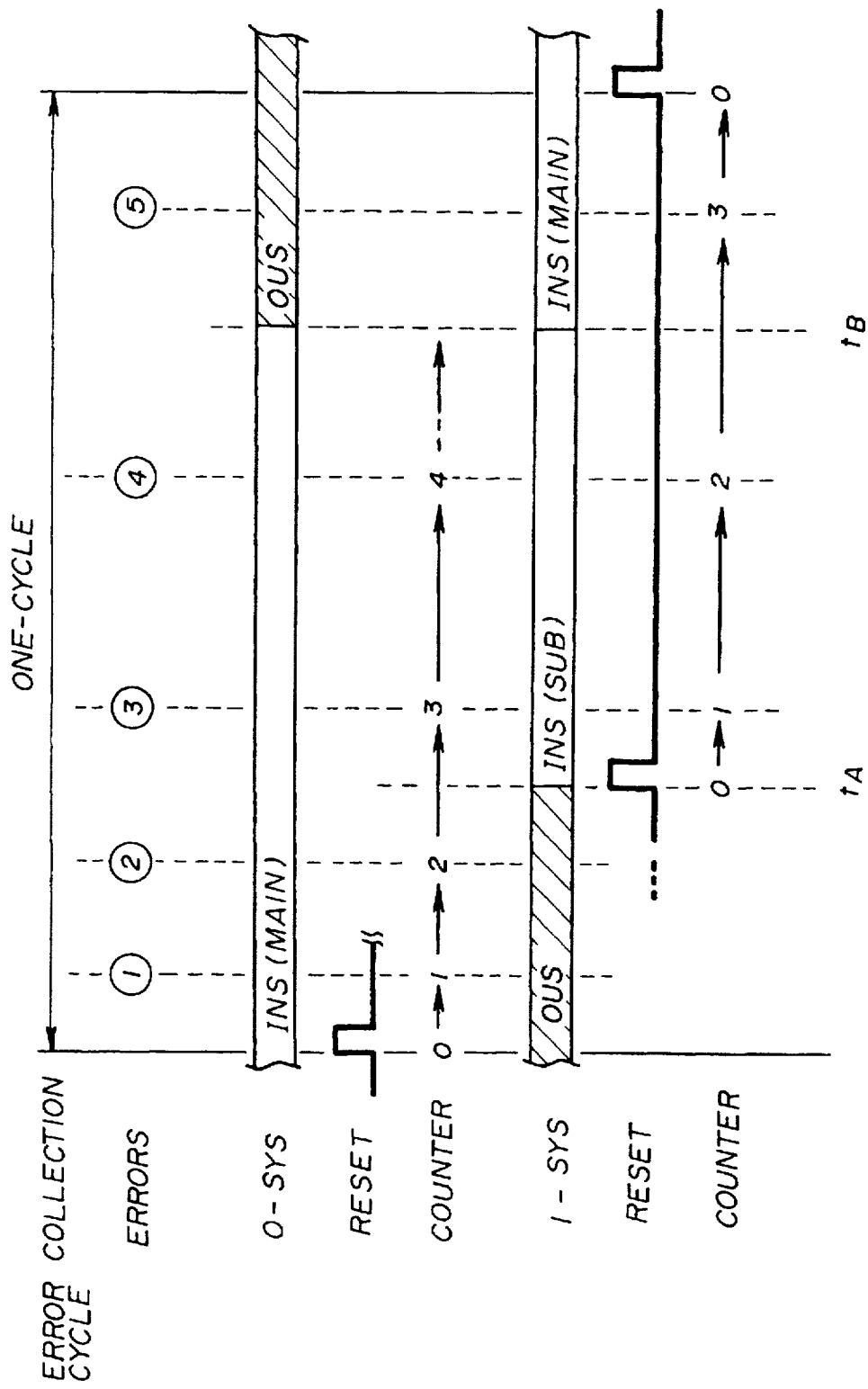
FIG. 4 is a timing chart illustrating state changes of a 0-system and a 1-system in the switching system and error count values in both the 0-system and 1-system.
Figure 5:
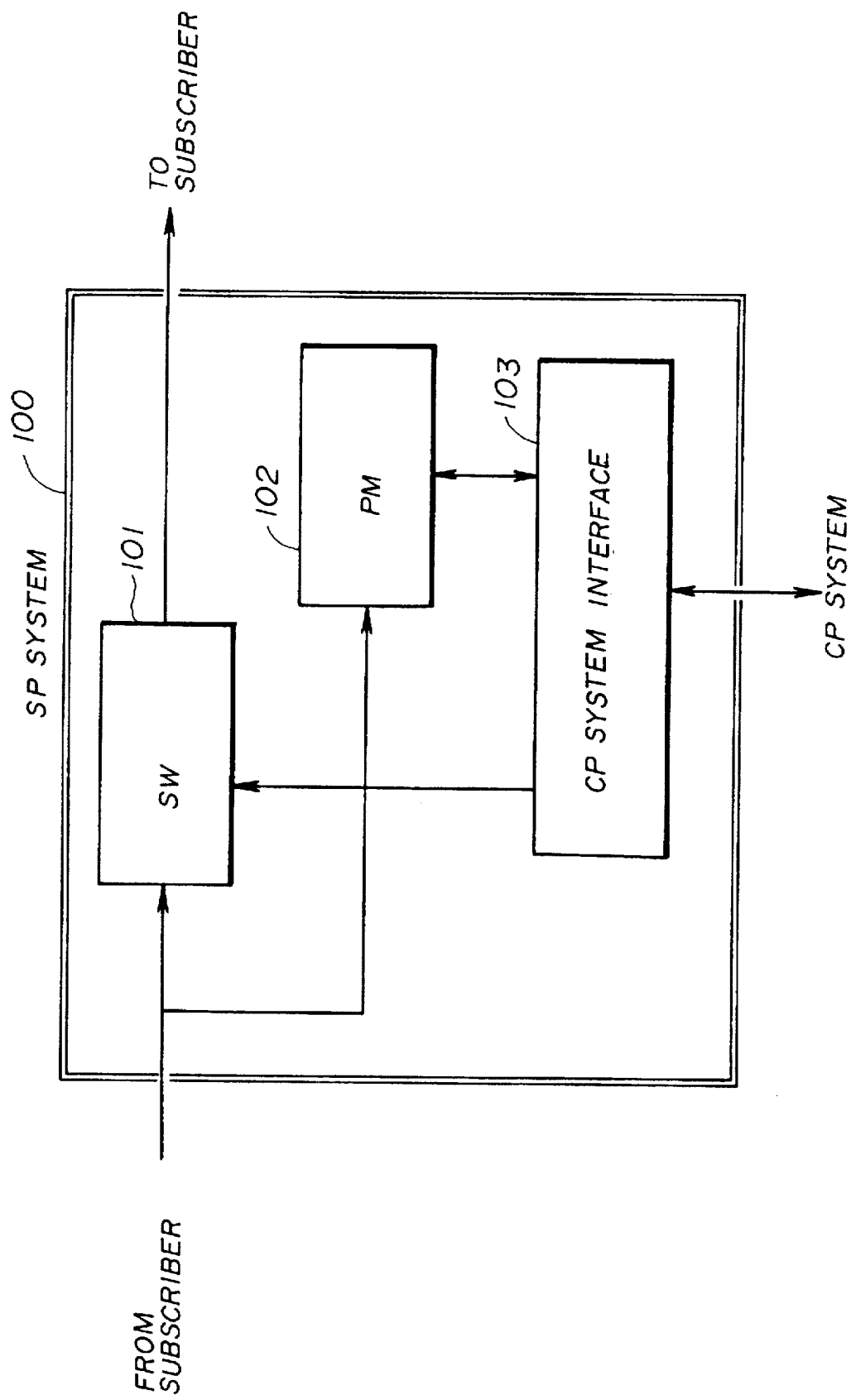
FIG. 5 is a block diagram illustrating a configuration of each of the SP systems, according to an embodiment of the present invention, provided in the switching system shown in FIG. 1.

In an embodiment of the present invention, a switching system is formed as shown in FIG. 1 in the same manner as in the above conventional case. Each of the SP (Speech Path) systems 100(1) and 100(2) in the switching system is formed as shown in FIG. 5. Referring to FIG. 5, the SP system 100 has a switching unit 101, a performance monitor unit (hereinafter referred to as a PM unit) 102 and a CP system interface unit 103. The switching unit 101 selects a data path through which data received from a subscriber terminal should be transmitted to another subscriber terminal (performs a switching operation). The CP system interface unit 103 is connected to the CP systems 200(1) and 200(2) (see FIG. 1). The CP interface unit 103 performs interface operations between the CP systems 200(1) and 200(2) and both the switching unit 101 and the PM unit 102. In FIG. 5, thick lines represent data routes and thin lines represent control/monitor signals.

The data from one subscriber terminal is transmitted through the switching unit 100 to the other subscriber unit and is supplied to the PM unit 102. The CP system interface unit 103 analyzes control data from each of the CP systems 200(1) and 200(2). Control instructions based on the control data are supplied from the CP system interface unit 103 to the switching unit 101 and the PM unit 102. That is, the CP system interface unit 103 controls the switching unit 101 and the PM unit 102 based on the control signals supplied from the CP systems 200(1) and 200(2). The PM unit 102 performs the error count operation, and the error count value and the TCA are supplied via the CP system interface 103 to the CP systems 200(1) and 200(2).

Figure 6:
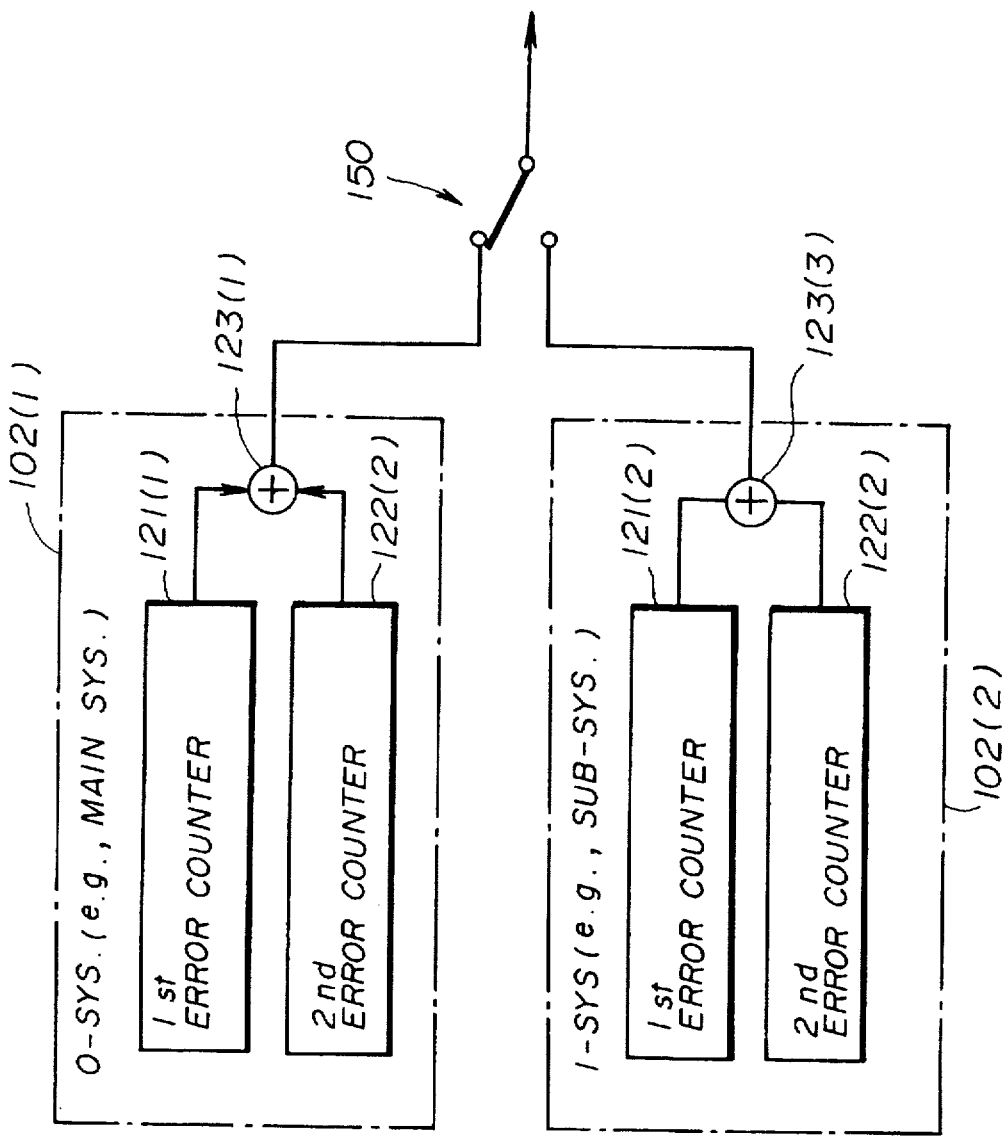
FIG. 6 is a block diagram illustrating a principle of the performance monitor units in the SP systems.

Essential structures for the error counting operation in the respective PM units 102(1) and 102(2) are shown in FIG. 6. Referring to FIG. 6, the respective PM units 102(1) and 102(2) have first error counters 121(1) and 121(2), second error counters 122(1) and 122(2) and adders 123(1) and 123(2). In each of the PM units 102(1) and 102(2), the error counting operation is performed using two error counters so that a correct error count value selected by a selector 150 is always correct. The detailed description of the error counting operation will be given later.

Figure 7:
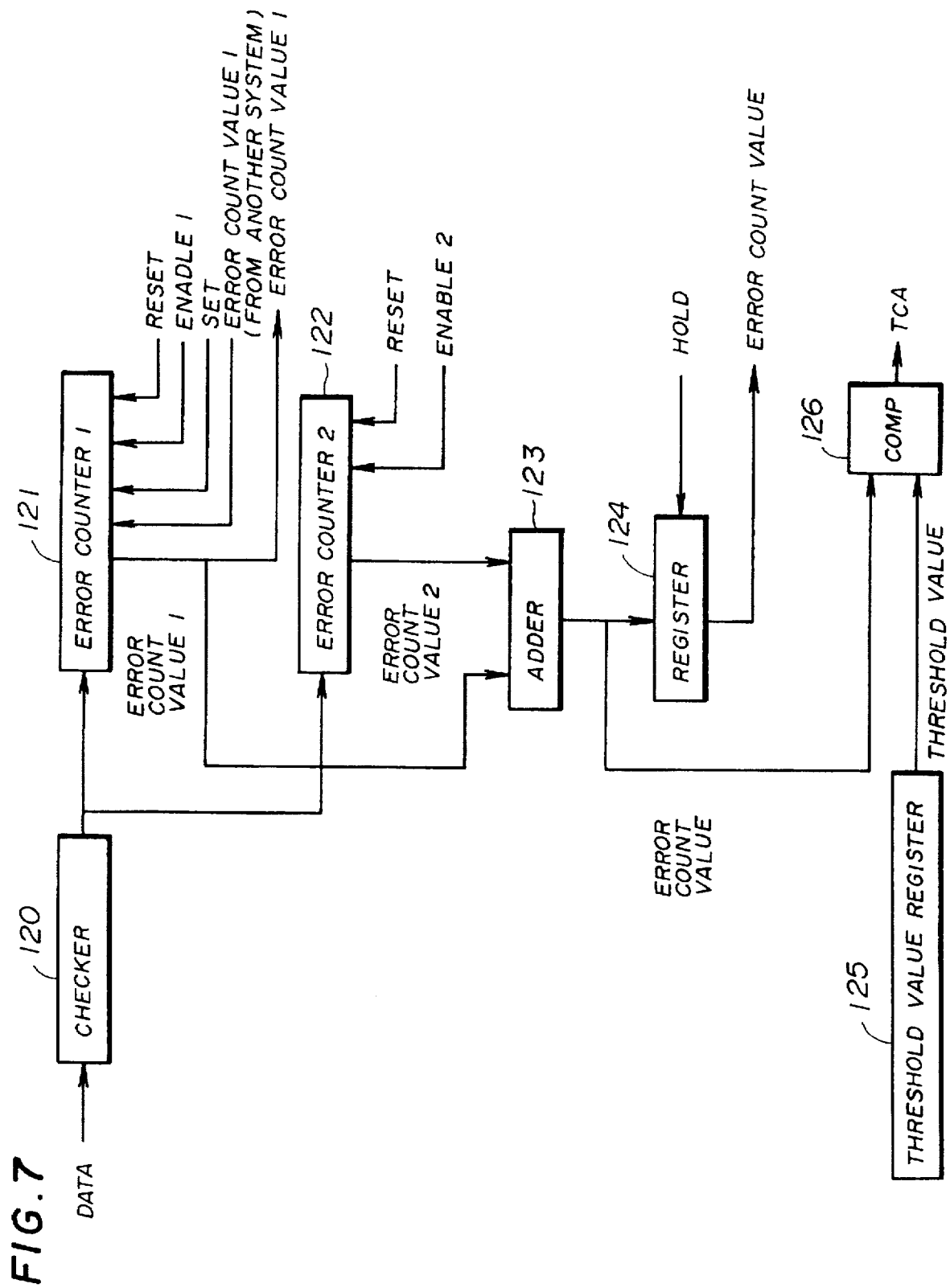
FIG. 7 is a block diagram illustrating a structure of each of the performance monitor units.

A detailed structure of each of the PM units 102(1) and 102(2) are formed as shown in FIG. 7. Referring to FIG. 7, each of the PM units 102(1) and 102(2) has a checking circuit 120, a first error counter 121, a second error counter 122, an adder 123, a first register 124, a second register 125 and a comparator 126. The checking circuit 120 checks whether an error (e.g., a bit error) occurs in the data received from a subscriber terminal. Every time the checking circuit 120 detects that an error occurs in the data, a detecting signal is supplied to the first error counter 121 and the second error counter 122.

The first error counter 121 is provided with a reset signal, a first enable signal (EN1) and a setting signal from the CP system interface unit 103. When the first enable signal (EN1) is active, the first error counter 121 is in an enable state and increments a first error count value by one every time the detecting signal is supplied from the checking circuit 120. When the first enable signal (EN1) is inactive, the first error counter 121 is in a disable state. The first error counter 121 is reset to "0" by the reset signal. The first error counter 121 is provided with a first error count value from the PM unit in the other SP system. The first error count value from the other PM unit in the other SP system is set in the first error counter 121 by the setting signal.

The second error counter 122 is provided with a reset signal and a second enable signal (EN2). When the second enable signal (EN2) is active, the second error counter 122 is in an enable state and increments a second error count value every time the detecting signal is supplied from the checking circuit 120. When the second enable signal (EN2) is inactive, the second error counter 122 is in a disable state. The second error counter 122 is reset to "0" by the reset signal.

The first error count value from the first error counter 121 and the second error count value from the second error counter 122 are added by the adder 123. The adder 123 outputs an error count value (C) as a monitoring result. The error count value (C) output from the adder 123 is supplied to the first register 124 and the comparator 126. When a hold signal is supplied to the first register 124, the error count value (C) is set in the first register 124. A predetermined threshold value TH is previously set in the second register 125. The comparator 126 compares the error count value (C) supplied thereto with the predetermined threshold value TH. When the error count value (C) exceeds the predetermined threshold value TH, the comparator 126 outputs the TCA.

Figure 8:
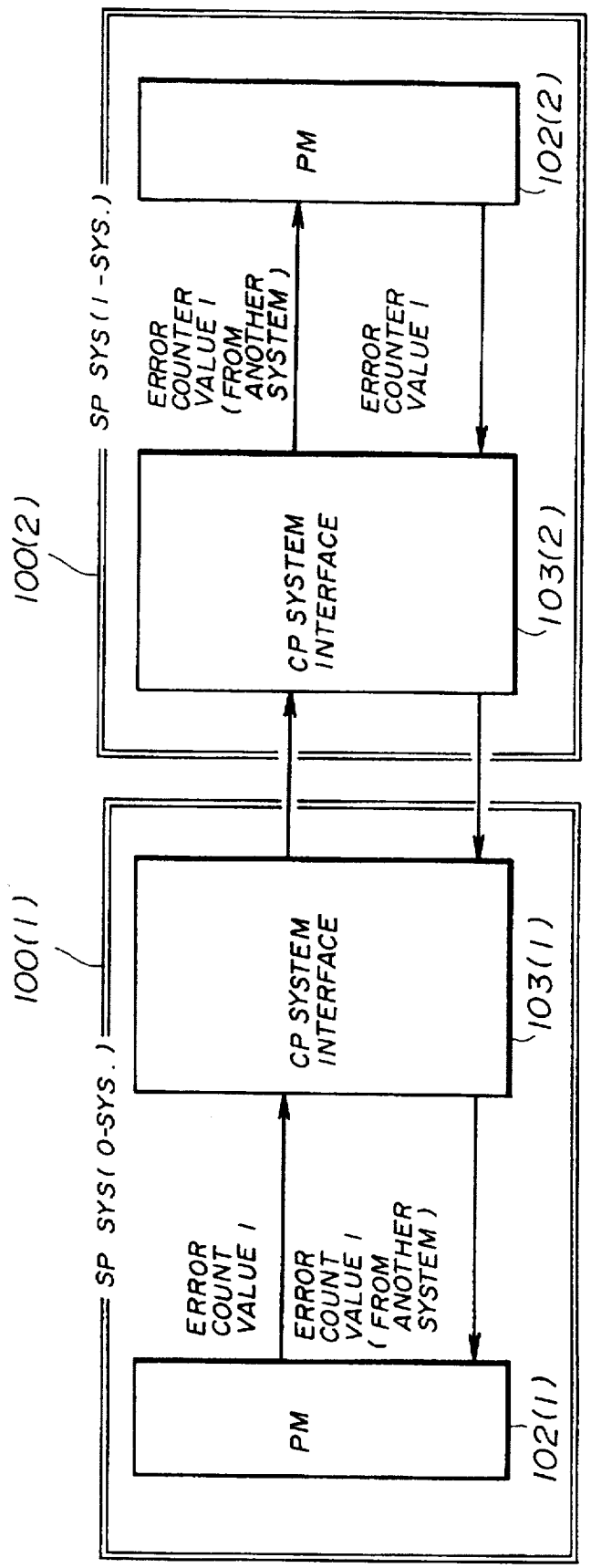
FIG. 8 is a block diagram illustrating a performance monitor unit provided in each of the SP systems in the embodiment of the present invention.

The CP system interface unit 103(1) in the SP unit 100(1) (referred to as the 0-system) and the CP system interface 103(2) in the SP system 100(2) (referred to as the 1-system) are coupled to each other as shown in FIG. 8. Referring to FIG. 8, the first error count value from the PM unit 102(1) in the 0-system is supplied through the CP system interface unit 103(1) to the 1-system. The first error count value received by the 1-system is supplied through the CP system interface 103(2) to the PM unit 102(2). In addition, the first error count value from the PM unit 102(2) in the 1-system is supplied through the CP system interface unit 103(2) to the 0-system. The first error count value received by the 0-system is supplied through the CP system interface 103(1) to the PM unit 102(1). That is, the first error count value from the PM unit in one SP system is supplied to the PM unit in the other SP system.

In a general case where the 0-system and the 1-system (the SP systems 100(1) and 100(2)) are in the INS state, the PM units 102(1) and 102(2) in both the 0-system and the 1-system operate as follows.

The PM units 102(1) and 102(2) operate in the same manner. In each of the PM units 102(1) and 102(2), at the start of an error collection cycle, the first error counter 121 and the second error counter 122 are reset by the reset signals supplied from the CP system interface unit 103. The first counter 121 and the second counter 122 respectively receive the first enable signal (EN1) which is active and the second enable signal (EN2) which is inactive from the CP system interface unit 103. Thus, the first error counter 121 is in the enable state and the second error counter 122 is in the disable state. The first error counter 121 increments the first error count value by one every time the checking circuit 120 detects an error (e.g., a bit error). The second error count value in the second error counter 122 is maintained at "0".

The adder 123 adds the first error count value and "0" and outputs the error count value C equal to the first error count value. At the end of the error collection cycle, the error count value C is set in the first register 124. The error count value set in the first register 124 in the system (the 0-system or the 1-system) which operates as the main-system is used as the monitoring result.

For example, in a case where the 0-system operates as the main-system, if the state of the 0-system is changed from the INS state to the OUS state, the 1-system starts to operate as the main-system. The first counter 121 in the PM unit 102(2) continuously performs the counting operation as described above, and the error count value C is output as the monitoring result from PM unit 102(2).

Figure 9:
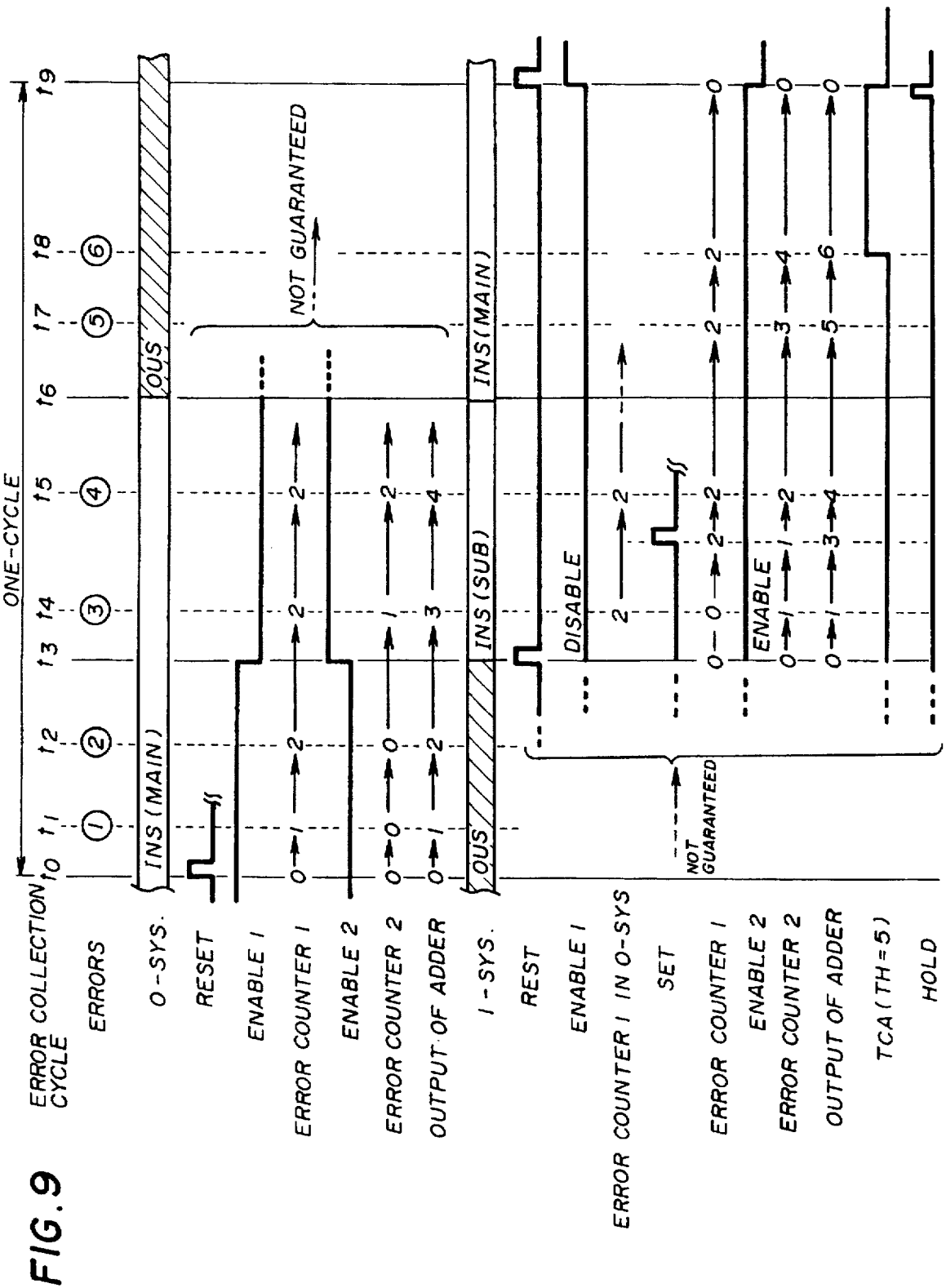
FIG. 9 is a timing chart illustrating state changes of a 0-system and a 1-system in the switching system and error count values in both the 0-system and 1-system in the embodiment of the present invention.

On the other hand, in a case where the states of the 0-system and the 1-system (the SP systems 100(1) and 100(2) are changed in one error collection cycle as shown in FIG. 9, the PM units 102(1) and 102(2) in the 0-system and the 1-system operate as follows.

Referring to FIG. 9, in the 0-system which operate as the main-system in the INS state, the first error counter 121 and the second error counter 122 are reset by the reset signal supplied from the CP system interface unit 103(1) at the start of the error collection cycle (at a time $t_0$). At this time, the first error counter 121 is in the enable state and the second error counter 122 is in the disable state in the same manner as in the above general case. Thus, the first error counter 121 increments the first error count value by one at each of times $t_1$ and $t_2$ at which errors (①②) are detected. The second error count value in the second error counter 122 is maintained at "0". As a result, the error count value C which is output from the adder 123 increases by one every time the error is detected (at the times $t_1$ and $t_2$). That is, the error count value C corresponds to the number of errors which have occurred.

In the 1-system which is in the OUS state, various signals are not guaranteed, so that the CP systems 200(1) and 200(2) disregard the signals from the 1-system. After a maintenance procedure for the 1-system (the SP system 100(2)) is terminated, the 1-system is controlled so that the state thereof is changed from the OUS state to the INS state at a time $t_3$. From this time $t_3$, the 1-system starts to operate as the sub-system in the INS state. In the 1-system, the first enable signal (EN1) is inactive and the second enable signal (EN2) is active. Thus, the first error counter 121 is in the disable state and the second error counter 122 is in the enable state. The first and second error counters 121 and 122 are reset to "0" by the reset signals at the time $t_3$. After this, the second error counter 122 increments the second error count value every time an error (③④⑤⑥) is detected by the checking circuit 120 (at each of times $t_4$, $t_5$, $t_7$ and $t_8$). The first error count value in the first error counter 121 is maintained at "0". At a time after the first and second error counters 121 and 122 are reset, the set signal is supplied from the CP system interface unit 103(2) to the first error counter 121. As a result, the first error count value (equal to "2" in this case) which is supplied from the 0-system is set in the first error counter 121 in the 1-system (a copying operation). After this, the first error count value "2" is maintained in the first error counter 121.

In the 0-system, when the state of the 1-system is changed from the OUS state to the INS state at the time $t_3$, the first enable signal (EN1) is turned inactive so that the state of the first error counter 121 is changed to the disable state. After this, the first error count value (equal to "2" in this case) is maintained in the first error counter 121. In addition, at the time $t_3$, the second enable signal (EN2) is turned active so that the state of the second error counter 122 is changed to the enable state. After this, the second error counter 122 starts the counting operation so as to increment the second error count value every time an error (③④) is detected by the checking circuit 120 (at each of times $t_4$ and $t_5$).

Thus, after the time $t_3$, the second error count values in the second error counters 122 in both the 0-system and the 1-system are equal to each other. In addition, after the first error count value "2" from the 0-system is set in the first error counter 121, the first error count values in the first error counters 122 in both the 0-system and the 1-system are equal to each other. In each of the 0-system and the 1-system, the first error count value "2" and the second error count value are added by the adder 123, and the error count value C is output from the adder 123. Thus, after the new first error count value is set in the first error counter 121 in the 1-system, the same error count value C is obtained in both the 0-system and the 1-system.

In this state, when the state of the 0-system is changed from the INS state to the OUS state at a time $t_6$ (e.g., caused by malfunction of the 0-system), the 1-system starts to operate as the main-system. After this, the second error counter 122 increments the second error count value by one every time an error (⑤⑥) is detected by the checking circuit 122 at a time ($t_7$ and $t_8$). The error count value C output from the adder 123 is also incremented by one at every time an error is detected. The error count value C obtained in the 1-system corresponds to the number of errors which have occurred.

If a value of "5" is set as the threshold value TH in the second register 125 in each of the 0-system and the 1-system, in the 1-system, the comparator 126 outputs the TCA at the time $t_8$ at which the error count value C (=6) (the output of the adder 123) exceeds the threshold value TH (=5). Immediately before the end of the error collection cycle, the hold signal is supplied to the first register 124, so that the error count value C which has been obtained at the time $t_8$ is set in the first register 124. The error count value C set in the first resister 124 in the 1-system is used as the monitoring result in the switching system.

At a time $t_9$, the error collection cycle is ended. At this time, the reset signals are supplied to the first and second error counters 121 and 122 in the 1-system, so that the next error collection cycle starts. In the next error collection cycle, the first enable signal (EN1) is active and the second enable signal (EN2) is inactive, so that the first error counter 121 is in the enable state and the second error counter 122 is in the disable state. The 1-system continuously operates as the main-system. The 0-system is maintained in the OUS system until the malfunction is recovered.

According to the above performance monitor system having the duplex configuration, even if the state of the 0-system is changed from the INS state to the OUS state after the state of the 1-system is changed from the OUS state to the INS state in one error collection cycle, the error count value C obtained in the main-system is always equal to the number of errors which are actually detected by the checking circuit 120. That is, based on the error count value C obtained in the main-system, the transmission performance in the switching system can be accurately monitored.

Additionally, in the above embodiment, when the state of the 1-system is changed from the OUS state to the INS state, the second error counter in the 1-system is active. After this, even if one or a plurality of errors are detected before the first error count value in the 0-system is set in the first error counter 121 (the copy operation is completed) in the 1-system, the second error counter in the 1-system increments the second error count value by one every time an error is detected. Thus, in the 1-system, after the copy operations are completed, the error count value (the sum of the first error count value and the second error count value) corresponds to the number of errors which have been detected from the start of the error collection cycle.

The present invention is not limited to the aforementioned embodiments, and other variations and modifications may be made without departing from the scope of the claimed invention.

What is claimed is:

1. A performance monitor system for monitoring a number of errors occurring in data processed in a communication apparatus having a duplex configuration formed of two systems which are able to be in an operable state and in an inoperable state, each of said two systems operating as one of a main-system and a sub-system in the operable state, said performance monitor system comprising:

a first unit for monitoring a number of errors occurring in data processed in one of said two systems;

a second unit for monitoring a number of errors occurring in data processed in another one of said two systems; and control means for controlling operations of said first and second units, wherein each of said first and second units comprises:

a first counter counting the number of errors and outputting a first error count value; and a second counter counting the number of errors and outputting a second error count value, wherein said control means comprises:

first control means for controlling said first counter and said second counter so that only said first counter is activated and starts to count the number of errors at a start of an error collection cycle;

second control means for controlling said second counter in each of said two systems so that said second counter is activated and starts to count the number of error when a state of one of said two systems is changed from the inoperable state to the operable state under a condition in which another one of said systems is operating as the main-system in the operable state;

third control means for controlling said first counter in one system which operates as the main-system so as to maintain the first error count value which is obtained when a state of another system is changed from the inoperable state to the operable state; and fourth control means for controlling said first counter in one system in which a state thereof is changed from the inoperable state to the operable state so that the first count value is equal to the value which has been maintained in said first counter in another system is set after the state of said one system is changed to the operable state, and wherein a sum of the first error count value and the second error count value in said first and second counter in each of said first and second units is used as a monitoring result.

2. The performance monitor system as claimed in claim 1, wherein each of said first and second units further comprises adding means for adding the first error count value and the second error count value to each other and outputting a error count value as the monitoring result.

3. The performance monitor system as claimed in claim 2 further comprising means for outputting an alert when the error count value from said adding means exceeds a predetermined threshold value.

4. A performance monitor method in a performance monitor system for monitoring a number of errors occurring in data processed in a communication apparatus having a duplex configuration formed of two systems which are able to be in an operable state and in an inoperable state, each of said two systems being operating as one of a main-system and a sub-system in the operable state, said performance monitor system comprising a first unit for monitoring a number of errors occurring in data processed in one of said two systems and a second unit for monitoring a number of errors occurring in data processed in another one of said two systems, each of said second and first units comprising a first counter counting the number of errors and outputting a first error count value and a second counter counting the number of errors and outputting a second error count value, a sum of the first error count value and the second error count value being used as a monitoring result, said method comprising the steps of:

(a) activating said first counter so that said first counter starts to count the number of errors at a start of an error collection cycle;

(b) activating said second counter in each of said two systems so that said second counter starts to count the number of errors when a state of one of said two systems is changed from the inoperable state to the operable state under a condition in which another one of said systems is operating as the main-system in the operable state;

(c) maintaining the first error count value which is obtained, in said first counter in one system which operates as the main-system, when a state of another system is changed from the inoperable state to the operable state; and (d) controlling said first counter in one system in which a state thereof is changed from the inoperable state to the operable state so that the first count value equal to the value which has been maintained in said first counter in another one system is set after the state of said one system is changed to the operable state.

* * * * *

UNITED STATES PATENT AND TRADEMARK OFFICE
CERTIFICATE OF CORRECTION

PATENT NO. : 5,784,274
DATED : July 21, 1998
INVENTOR(S) : Masami MURAYAMA, et al.

It is certified that error appears in the above-indentified patent and that said Letters Patent is hereby corrected as shown below:

On the title page, ITEM 30, insert --FOREIGN APPLICATION PRIORITY DATA, June 2, 1995, [JP], JAPAN, 7-136422--

Signed and Sealed this

Fourteenth Day of September, 1999

Attest:

Q. TODD DICKINSON

*Attesting Officer*   *Acting Commissioner of Patents and Trademarks*